US008942911B2

(12) United States Patent
Debs et al.

(10) Patent No.: US 8,942,911 B2
(45) Date of Patent: Jan. 27, 2015

(54) SYSTEM AND METHOD FOR DETECTING A STUCK VEHICLE ACCELERATOR AND REMEDIAL CONTROL

(75) Inventors: William E. Debs, Novi, MI (US); Brian S. Schang, Wixom, MI (US); J. Oscar Aparicio, Jr., Milford, MI (US); Paul A. Bauerle, Fenton, MI (US); Joseph E. Ploucha, Commerce Township, MI (US); Daniel G. Bolstrum, West Bloomfield, MI (US)

(73) Assignee: GM Global Technology Operations LLC

( * ) Notice: Subject to any disclaimer, the term of this patent is extended or adjusted under 35 U.S.C. 154(b) by 1193 days.

(21) Appl. No.: 12/764,580

(22) Filed: Apr. 21, 2010

(65) Prior Publication Data

US 2011/0264354 A1    Oct. 27, 2011

(51) Int. Cl.
```
G06F 7/00        (2006.01)
G06F 17/00       (2006.01)
F02B 77/08       (2006.01)
B60K 26/02       (2006.01)
```
(Continued)

(52) U.S. Cl.
CPC .............. B60K 26/02 (2013.01); F02D 11/105 (2013.01); F02D 11/107 (2013.01); B60W 10/06 (2013.01); B60W 2510/186 (2013.01); B60W 2520/10 (2013.01); B60W 2540/10 (2013.01); B60W 2540/12 (2013.01); F02D 11/106 (2013.01); F02D 2011/108 (2013.01); F02D 2200/501 (2013.01); F02D 2200/602 (2013.01); F02D 2250/26 (2013.01)

USPC ....... 701/107; 701/110; 701/114; 123/198 D; 123/682; 123/590

(58) Field of Classification Search
CPC .......... F02D 11/107; F02D 2009/0277; F02D 2011/108; F02D 2200/501; F02D 2200/602; F02D 2250/26
USPC .......... 701/103, 110, 107, 114; 123/396, 399, 123/198 D, 492, 682, 687, 688, 690
See application file for complete search history.

(56) References Cited

U.S. PATENT DOCUMENTS

| | | | | |
|---|---|---|---|---|
| 3,731,663 A | * | 5/1973 | Hollins | ......................... 123/397 |
| 4,472,777 A | * | 9/1984 | Youngblood | .................. 701/110 |

(Continued)

FOREIGN PATENT DOCUMENTS

| | | |
|---|---|---|
| DE | 3715959 | 11/1988 |
| DE | 4017045 | 11/1991 |

(Continued)

OTHER PUBLICATIONS

Office Action dated Dec. 30, 2011 from the German Patent Office for German Patent Application No. 10 2011 017 412.5, 6 pages.

Primary Examiner — Mahmoud Gimie
Assistant Examiner — David Hamaoui

(57) ABSTRACT

A control system for a vehicle includes an error detection module and a remedial control module. The error detection module detects whether an accelerator of the vehicle is stuck is based on vehicle speed, a position of the accelerator, and one of a pressure applied to a brake of the vehicle and a status of a parking brake of the vehicle. The remedial control module, when the accelerator is stuck, at least one of resets the position of the accelerator and decreases torque output of a powertrain system.

22 Claims, 3 Drawing Sheets

(51) Int. Cl.
 *F02D 11/10* (2006.01)
 *B60W 10/06* (2006.01)

(56) References Cited

U.S. PATENT DOCUMENTS

| | | | | |
|---|---|---|---|---|
| 4,640,248 | A | * | 2/1987 | Stoltman ........................ 123/399 |
| 4,987,872 | A | * | 1/1991 | Geselle et al. ................. 123/396 |
| 5,150,681 | A | * | 9/1992 | Kull et al. ..................... 123/399 |
| 5,529,039 | A | * | 6/1996 | Streib ............................ 123/399 |
| 5,780,782 | A | | 7/1998 | O'Dea |
| 6,324,459 | B1 | * | 11/2001 | Jung ................................ 701/70 |
| 6,419,037 | B1 | | 7/2002 | Kramer et al. |
| 6,442,468 | B2 | | 8/2002 | Nishimura |
| 7,070,247 | B2 | | 7/2006 | Offerle |
| 7,226,389 | B2 | | 6/2007 | Steen et al. |
| 7,447,585 | B2 | | 11/2008 | Tandy et al. |
| 8,291,883 | B2 | * | 10/2012 | Ludwigsen ............ 123/198 DC |
| 8,425,380 | B2 | * | 4/2013 | Yamazaki ..................... 477/204 |
| 2007/0034440 | A1 | | 2/2007 | Zomotor |

FOREIGN PATENT DOCUMENTS

| | | | |
|---|---|---|---|
| DE | 19920851 | | 5/2004 |
| DE | 102005001550 A1 | | 7/2006 |
| EP | 0230722 A1 | | 11/1986 |
| GB | 2226658 A | * | 7/1990 ............. F02D 41/02 |
| KR | 2005034865 A | * | 4/2005 |

* cited by examiner

SYSTEM AND METHOD FOR DETECTING A STUCK VEHICLE ACCELERATOR AND REMEDIAL CONTROL

FIELD

The present disclosure relates to vehicle control systems, and more particularly to a system and method for detecting a stuck vehicle accelerator and remedially controlling a powertrain system of the vehicle.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air/fuel (A/F) mixture within cylinders to drive pistons that rotatably turn a crankshaft generating drive torque. The drive torque may be transferred to a driveline (e.g., wheels) of a vehicle via a transmission. Air may be drawn into an intake manifold of the engine through an inlet that may be regulated by a throttle. The throttle may be controlled either mechanically or electronically based on input from a driver of the vehicle. The driver input may include acceleration based on a position of an accelerator (e.g., a pedal).

SUMMARY

A control system for a vehicle includes an error detection module and a remedial control module. The error detection module detects whether an accelerator of the vehicle is stuck is based on vehicle speed, a position of the accelerator, and one of a pressure applied to a brake of the vehicle and a status of a parking brake of the vehicle. The remedial control module, when the accelerator is stuck, at least one of resets the position of the accelerator and decreases torque output of a powertrain system.

A method for controlling a vehicle includes detecting whether an accelerator of the vehicle is stuck is based on vehicle speed, a position of the accelerator, and one of a pressure applied to a brake of the vehicle and a status of a parking brake of the vehicle, and when the accelerator is stuck, at least one of resetting the position of the accelerator and decreasing torque output of a powertrain system.

In still other features, the systems and methods described above are implemented by a computer program executed by one or more processors. The computer program can reside on a tangible computer readable medium such as but not limited to memory, nonvolatile data storage, and/or other suitable tangible storage mediums.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
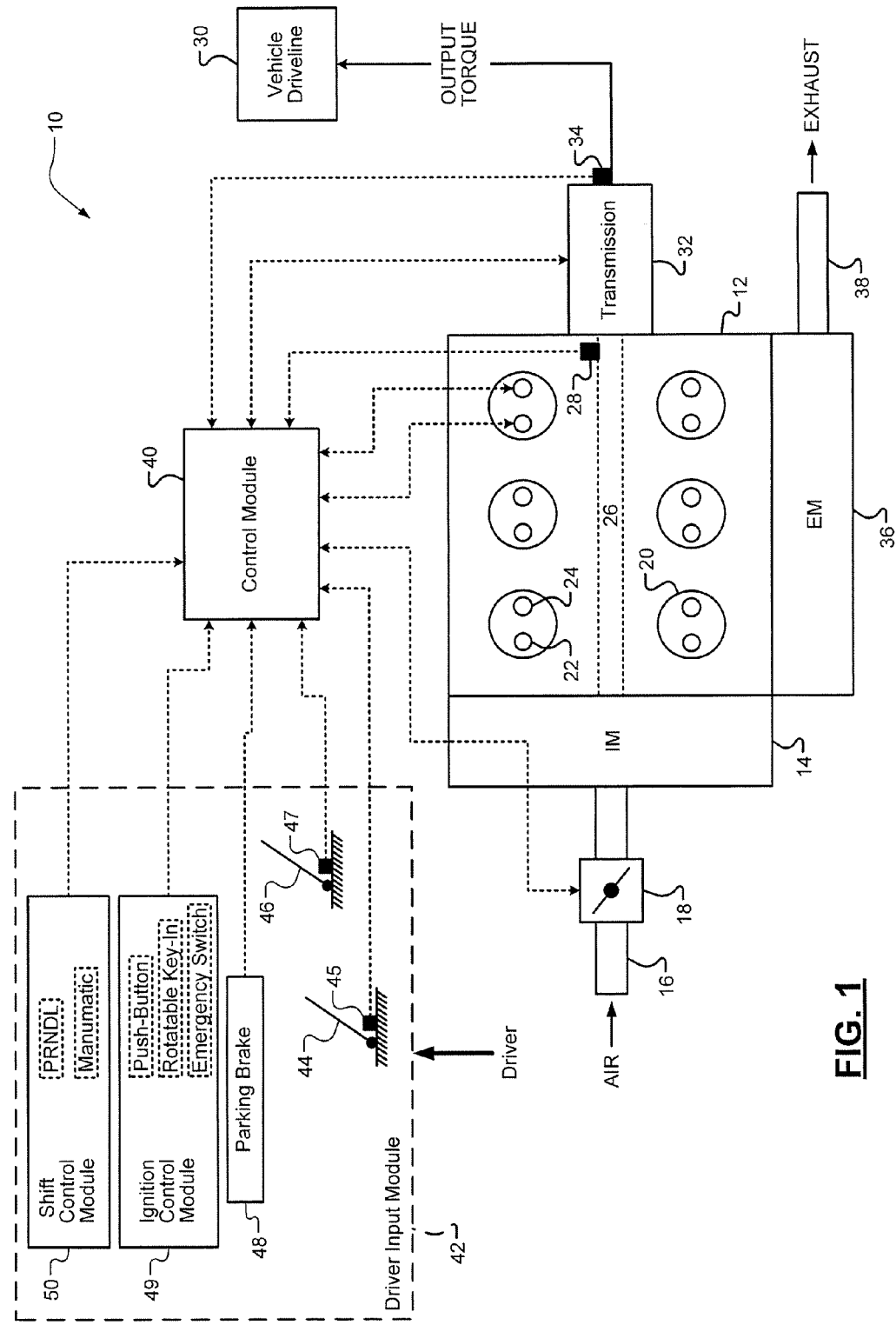
FIG. 1 is a functional block diagram of an exemplary powertrain system according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

During vehicle operation an accelerator (e.g., a pedal) may become physically and unintentionally displaced. In other words, the accelerator may become "stuck." For example, the accelerator may become stuck due to improperly placed and/or improperly designed floor mats or due to other loose objects obstructing the accelerator. The stuck accelerator may increase torque output of a powertrain and thus increase a speed of the vehicle above a desired speed. Moreover, when the accelerator becomes stuck a driver of the vehicle may then be unable to decrease the speed of the vehicle. More specifically, brakes may be insufficient to decrease the speed of the vehicle. In other words, the brakes may be unable to overpower the torque output of the powertrain to allow the driver to decrease the speed of the vehicle.

Accordingly, a system and method are presented that detect when the accelerator is stuck and then remedially control the powertrain to allow the driver to decrease the speed of the vehicle. More specifically, the system and method may detect whether the accelerator is stuck based on vehicle speed, accelerator position, brake pressure, and corresponding thresholds. For example, the brake pressure (and duration) may be used to prevent false detections (e.g., drivers that simultaneously command the accelerator and the brake, also known as "two-footed drivers"). Additionally or alternatively, the system and method may detect whether the accelerator is stuck based on vehicle speed, accelerator position, a status of a parking brake, and corresponding thresholds. The system and method, however, may also determine that the accelerator is stuck based on other combinations of inputs (e.g., input from the driver requesting override operation).

When the accelerator is stuck, the system and method may command a reset of the accelerator position (i.e., set the position to zero). When the accelerator position reset occurs, the current position of the accelerator pedal becomes the learned idle position and further displacement of the accelerator pedal results in incremental torque requests from the idle torque request. If the accelerator position reset occurs when the accelerator is fully displaced, however, no additional torque may be requested via the accelerator. Additionally, as the accelerator pedal releases back towards its normal idle position, the learned idle position of the accelerator pedal may update to the current physical accelerator pedal position.

Resetting the accelerator position, therefore, may effectively override the stuck accelerator pedal and allow the driver to brake and stop the vehicle. Additionally or alternatively, when the accelerator is stuck and the driver requests override control (e.g., via a push-button ignition, a rotatable key-in ignition, or a separate emergency switch), the system and method may command idle operation of the powertrain. The idle operation of the powertrain may allow the driver to brake and stop the vehicle and may also provide a smoother transition to stop the vehicle as compared to a traditional emergency stop that immediately turns off the powertrain system. For example, commanding idle operation instead of turning off the powertrain system allows the driver to continue using hydraulic components such as hydraulic brakes (i.e., power brakes) and hydraulic steering (i.e., power steering).

Referring now to FIG. 1, a powertrain system 10 that powers a vehicle (not shown) includes an engine 12. While an internal combustion engine system is shown, the powertrain system may include an electric motor system or a hybrid system. For example, the powertrain system 10 may include at least one of a battery system, an electric motor, a generator, and an internal combustion engine. Additionally, while a spark ignition direct injection (SIDI) engine is shown, the engine 12 may include a compression ignition (CI) engine (e.g., a diesel engine) or a homogeneous charge compression ignition (HCCI) engine. Furthermore, the engine 12 may also include port fuel injection.

The engine 12 draws air into an intake manifold 14 through an inlet 16 that may be regulated by a throttle 18. For example, the throttle 18 may be electronically controlled (e.g., electronic throttle control, or ETC). Air in the intake manifold 14 is distributed to a plurality of cylinders 20. While six cylinders are shown, the engine 12 may include other numbers of cylinders. The air in the cylinders 20 may be combined with fuel from fuel injectors 22 to create an A/F mixture. The A/F mixture may be compressed by pistons (not shown) and ignited to rotatably turn a crankshaft 26 generating drive torque. For example, the A/F mixture may be ignited by spark from spark plugs 24. However, as previously described, other methods of fuel injection and/or combustion may be used depending on the type of powertrain.

An engine speed sensor 28 measures a rotational speed of the crankshaft 26 (e.g., in revolutions per minute, or RPM). The drive torque may be transferred from the crankshaft 26 to a driveline 30 (e.g., wheels) of the vehicle via a transmission 32. For example, the transmission 32 may be coupled to the crankshaft 26 via a torque converter (e.g., a fluid coupling) (not shown). A transmission output shaft speed (TOSS) sensor 34 may measure a rotational speed of an output shaft (not shown) of the transmission 32. For example, the measurement of the TOSS sensor 34 may indicate the speed of the vehicle. However, the vehicle speed may be measured or modeled using other suitable methods. Exhaust gas resulting from combustion may be expelled from the cylinders 20 into an exhaust manifold 36. The exhaust gas may then be treated by an exhaust treatment system 38 that decreases emissions before being released into the atmosphere.

A control module 40 controls operation of the powertrain system 10. Specifically, the control module 40 may control the throttle 18, the fuel injectors 22, the spark plugs 24, the transmission 32, and/or the exhaust treatment system 38. The control module 40 may also receive signals from the engine speed sensor 28 and the TOSS sensor 34. The control module 40 may also implement the system and/or method of the present disclosure. Specifically, the control module 40 may also receive input from a driver of the vehicle. For example, the control module 40 may receive input from the driver of the vehicle via one of a plurality of devices (collectively referred to as a "driver input module 42").

The driver input module 42 may include an accelerator 44, a brake 46, a parking brake 48, an ignition control module 49, and/or a shift control module 50. Specifically, the driver input may be based on a position of the accelerator 44 (e.g., a pedal) and a pressure applied to a brake 46 (e.g., a pedal). For example, a position sensor 45 may measure a position of the accelerator 44 and a pressure sensor 47 may measure a pressure applied to the brake 46. Furthermore, the driver input module 42 may include a parking brake 48 and an ignition control module 49.

For example, the status of the parking brake 48 (e.g., a handle or a pedal) may include either a first state (e.g., "ON," or engaged) or a second state (e.g., "OFF," or disengaged). Additionally, for example, the ignition control module 49 may include a push-button ignition or a rotatable key-in ignition. Moreover, both the push-button ignition and the rotatable key-in ignition may transition from first states to second states by a push or a turn from the driver, respectively.

Additionally or alternatively, the ignition control module 49 may include an emergency switch that may be actuated and deactivated by the driver by switching the emergency switch from a first state to a second state and vice-versa. The shift control module 50 may include a shift lever that may control various modes of the transmission 32. For example, the shift control module 50 may include a park/reverse/neutral/drive/low (PRNDL) shifter that allows the driver to select one of a park mode, a reverse mode, a neutral mode, a drive mode, and a low speed/load mode, respectively. Additionally, for example, the shift control module 50 may include an alternative manual shift selection mode (e.g., manumatic) that allows the driver to tap-up (e.g., upshift) or tap-down (e.g., downshift) to control shifting of the transmission 32.

Figure 2:
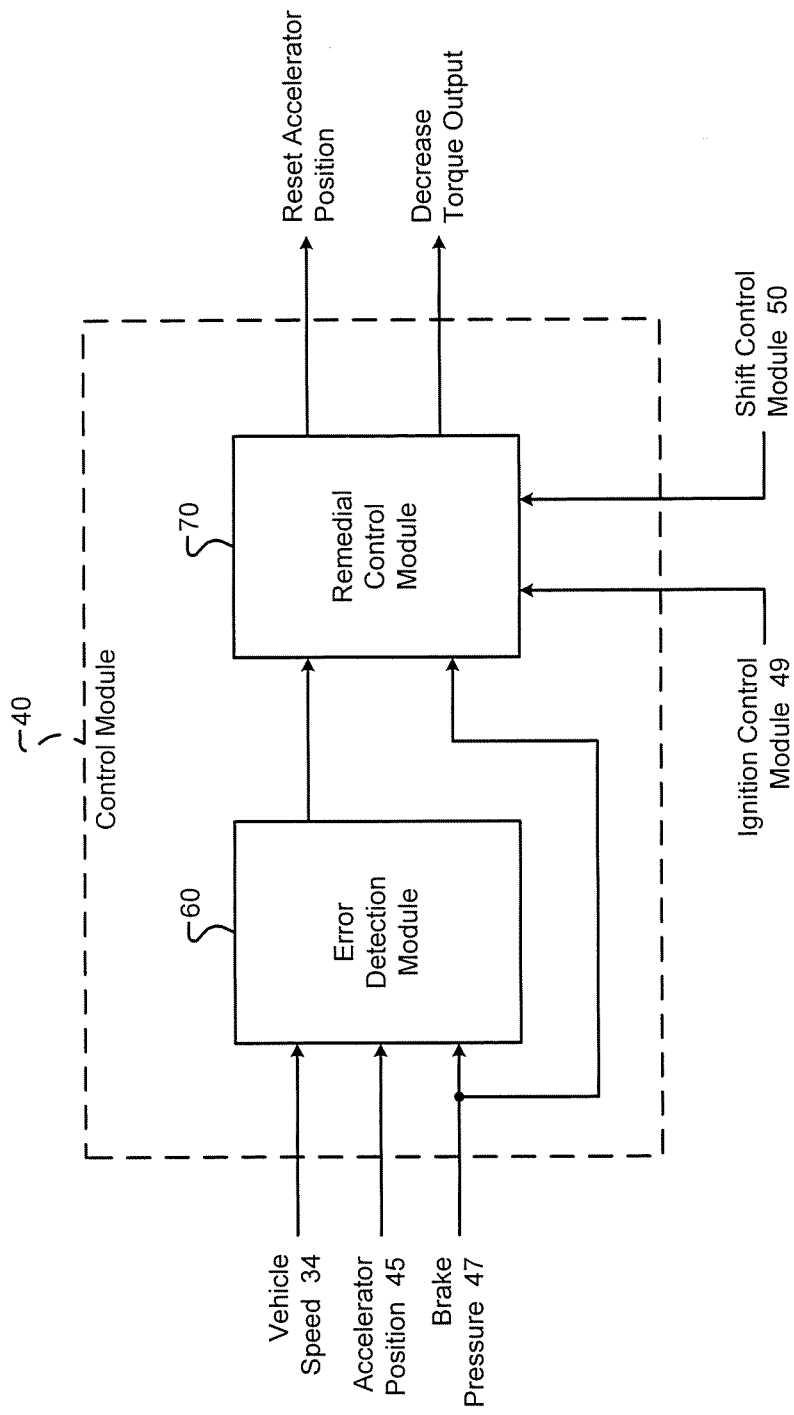
FIG. 2 is a functional block diagram of a control module according to the present disclosure.

Referring now to FIG. 2, the control module 40 is shown in more detail. The control module 40 may include an error detection module 60 and a remedial control module 70. The error detection module 60 receives signals from the TOSS sensor 34, the position sensor 45, and the pressure sensor 47. For example, the received signals may indicate vehicle speed, the position of the accelerator 44, and the pressure applied to the brake 46, respectively. The error detection module 60 may also receive a signal indicating the state of the parking brake 48.

The error detection module 60 determines whether the accelerator 44 is stuck based on the received signals. More specifically, the error detection module 60 may determine that the accelerator 44 is stuck when the vehicle speed is greater than a vehicle speed threshold ($VS_{TH}$), the position of the accelerator 44 is greater than an accelerator position threshold ($AP_{TH}$), and the pressure applied to the brake 46 is greater than a brake pressure threshold ($BP_{TH}$) for a predetermined period. Alternatively, the error detection module 60 may determine that the accelerator 44 is stuck when the vehicle speed is greater than the speed threshold $VS_{TH}$, the position of the accelerator is greater than the position threshold $AP_{TH}$, and the state of the parking brake 48 is the first state (e.g., ON, or engaged). The error detection module 60, however, may also determine that the accelerator 44 is stuck based on other combinations of the inputs. For example, when a driver of the vehicle indicates an emergency (e.g., via the ignition control module 49), the error detection module 60 may determine that the accelerator 44 is stuck. Otherwise, the error detection module 60 may determine that the accelerator 44 is not stuck.

The remedial control module 70 communicates with the error detection module 60 to determine whether the accelerator 44 is stuck. For example, the remedial control module 70 may receive a status signal from the error detection module 60 indicating whether the accelerator 44 is stuck. For example, the status signal may include either a first state ("YES") or a second state ("NO"). The remedial control module 70 may also receive an emergency signal from the ignition control module 49 indicating that the driver of the vehicle is requesting override control of the powertrain system 10.

Specifically, the driver of the vehicle may request override control of the powertrain system 10 when the accelerator 44 is stuck. For example, the driver may request override control by one press of a push-button ignition or one clockwise turn of a rotatable key-in ignition. Additionally or alternatively, for example, the driver may request override control by actuating the separate emergency switch (e.g., an ON/OFF button). Additionally or alternatively, for example, the driver may request override control by changing a selection of the shift control module 50 (e.g., change of PRNDL or a tap-up/tap-down in the manumatic mode).

The remedial control module 70 may reset the accelerator position (i.e., set the accelerator position to zero) when the accelerator 44 is stuck. When the accelerator position reset occurs, the current position of the accelerator 44 becomes the learned idle position and further displacement of the accelerator 44 results in incremental torque requests from the idle torque request. If the accelerator position reset occurs when the accelerator 44 is fully displaced, however, no additional torque may be requested via the accelerator 44. Additionally, as the accelerator 44 releases back towards its normal idle position, the learned idle position of the accelerator 44 may update to the current physical accelerator position.

When the accelerator 44 is stuck and the emergency signal is not received, however, the remedial control module 70 may decrease the torque output of the powertrain system 10. More specifically, the remedial control module 70 may decrease the torque output of the powertrain system 10 to a torque output as low as idle operation. For example, the remedial control module 70 may merely decrease the torque output of the powertrain system 10 when the driver is lightly applying the brake (e.g., brake pressure< threshold). The remedial control module 70, however, may decrease the torque output of the powertrain system 10 to idle operation (i.e., command idle operation) when the driver is heavily applying the brake (e.g., brake pressure> threshold).

For example, idle operation of the powertrain system 10 may include commanding the throttle 18 to a predetermined position, commanding the fuel injectors 22 to inject a predetermined amount of fuel, and commanding the fuel injectors 22 and the spark plugs according to predetermined timings. In other words, idle operation of the powertrain system 10 may include controlling the A/F ratio of the engine and combustion timing to maintain a relatively low engine speed and engine output torque.

Figure 3:
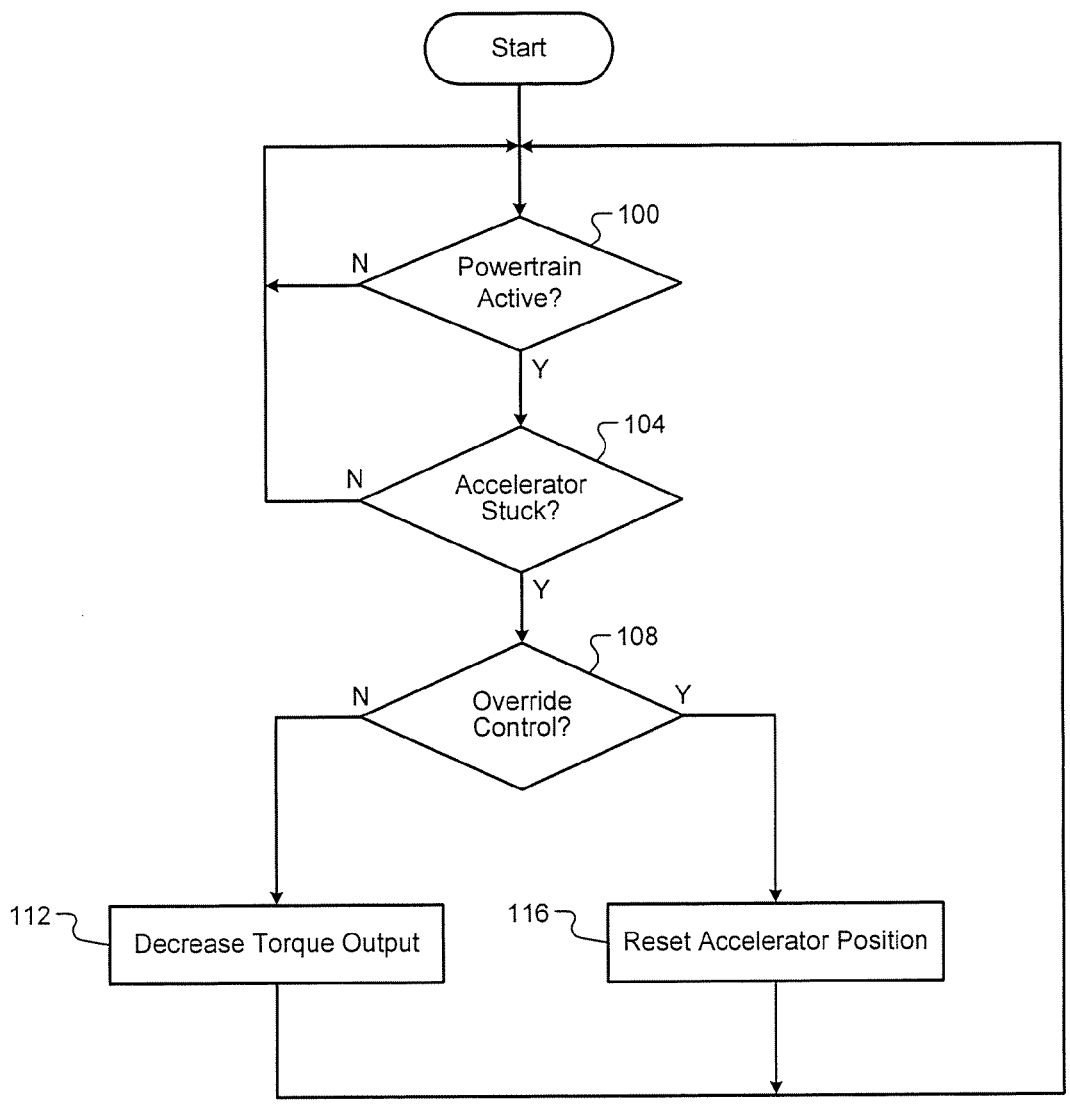
FIG. 3 is a flow diagram of an exemplary method for detecting a stuck accelerator and remedially controlling a powertrain according to the present disclosure.

Referring now to FIG. 3, a method for detecting whether the accelerator 44 is stuck and then controlling the powertrain system 10 begins at 100. At 100, the control module 40 may determine whether the powertrain system 10 is active. If true, control may proceed to 104. If false, control may return to 100.

At 104, the control module 40 may determine whether the accelerator 44 is stuck. If true, control may proceed to 108. If false, control may return to 100. At 108, the control module 40 may determine whether the driver has requested override control. If false, control may proceed to 112. If true, control may proceed to 116.

At 112, the control module 40 may decrease torque output of the powertrain system to a torque output as low as idle operation. For example, the decreased torque output may be based on a brake pressure applied by the driver (e.g., heavy brake pressure may result in idle operation). Control may then return to 100. At 116, the control module 40 may reset the accelerator position (e.g., set the accelerator position to zero). Control may then return to 100.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system for a vehicle, comprising:
   an error detection module that detects whether an accelerator of the vehicle is stuck is based on vehicle speed, a position of the accelerator, and one of a brake pressure applied by a driver to a brake of the vehicle and a status of a parking brake of the vehicle; and
   a remedial control module that, when the accelerator is stuck, decreases torque output of a powertrain system:
   to a torque output greater than idle operation when a brake pressure applied by the driver is less than a brake pressure threshold;
   to idle operation when the brake pressure applied by the driver is greater than the brake pressure threshold; and
   to idle operation when the driver requests override control of the powertrain system of the vehicle via an actuator of one of an ignition control module and a shift control module.

2. The control system of claim 1, wherein the error detection module detects that the accelerator is stuck when the vehicle speed is greater than a vehicle speed threshold, the position of the accelerator is greater than an accelerator position threshold, and the brake pressure applied by the driver is greater than a second brake pressure threshold for a predetermined period.

3. The control system of claim 2, wherein the error detection module detects that the accelerator is stuck when the vehicle speed is greater than the vehicle speed threshold, the position of the accelerator is greater than the accelerator position threshold, and the parking brake is engaged.

4. The control system of claim 1, wherein the ignition control module includes at least one of push-button ignition, a rotatable key-in ignition, and an emergency switch.

5. The control system of claim 4, wherein the request for override operation includes at least one of a single push of the push-button ignition, a single turn of the rotatable key-in ignition, and actuating the emergency switch from a first state to a second state.

6. The control system of claim 1, wherein the shift control module includes at least one of a park/reverse/neutral/drive/low (PRNDL) mode selector and a manumatic selector, and wherein the request for override operation includes at least one of a change of the PRNDL mode selector and a single tap-up or tap-down of the manumatic selector.

7. The control system of claim 1, wherein the remedial control module resets the position of the accelerator when the accelerator is stuck and the driver requests override operation.

8. The control system of claim 7, wherein resetting the position of the accelerator includes setting the position of the accelerator to zero.

9. The control system of claim 7, wherein resetting the position of the accelerator includes setting a learned idle position of the accelerator to a current position of the accelerator, and wherein further displacement of the accelerator results in incremental torque requests from an idle torque request.

10. The control system of claim 7, wherein resetting the accelerator position when the accelerator is fully displaced results in no additional requestable torque via the accelerator.

11. The control system of claim 9, wherein the learned idle position of the accelerator may update to the current accelerator position as the accelerator releases back towards a normal idle position.

12. A method for controlling a vehicle, comprising:
 detecting whether an accelerator of the vehicle is stuck is based on vehicle speed, a position of the accelerator, and one of a brake pressure applied by a driver to a brake of the vehicle and a status of a parking brake of the vehicle; and
 when the accelerator is stuck, decreasing torque output of a powertrain system:
  to a torque output greater than idle operation when a brake pressure applied by the driver is less than a brake pressure threshold;
  to idle operation when the brake pressure applied by the driver is greater than the brake pressure threshold; and
  to idle operation when the driver requests override control of the powertrain system of the vehicle via an actuator of one of an ignition control module and a shift control module.

13. The method of claim 12, further comprising detecting that the accelerator is stuck when the vehicle speed is greater than a vehicle speed threshold, the position of the accelerator is greater than an accelerator position threshold, and the brake pressure applied by the driver is greater than a second brake pressure threshold for a predetermined period.

14. The method of claim 13, further comprising detecting that the accelerator is stuck when the vehicle speed is greater than the vehicle speed threshold, the position of the accelerator is greater than the accelerator position threshold, and the parking brake is engaged.

15. The method of claim 12, further comprising receiving the request for override operation from at least one of push-button ignition, a rotatable key-in ignition, and an emergency switch of the ignition control module.

16. The method of claim 15, wherein the request for override operation includes at least one of a single push of the push-button ignition, a single turn of the rotatable key-in ignition, and actuating the emergency switch from a first state to a second state.

17. The method of claim 12, further comprising receiving the request for override operation from at least one of a park/reverse/neutral/drive/low (PRNDL) mode selector and a manumatic selector of the shift control module, wherein the request for override operation includes at least one of a change of the PRNDL mode selector and a single tap-up or tap-down of the manumatic selector.

18. The method of claim 12, further comprising resetting the position of the accelerator when the accelerator is stuck and the driver requests override operation.

19. The method of claim 18, wherein resetting the position of the accelerator includes setting the position of the accelerator to zero.

20. The method of claim 18, wherein resetting the position of the accelerator includes setting a learned idle position of the accelerator to a current position of the accelerator, and wherein further displacement of the accelerator results in incremental torque requests from an idle torque request.

21. The method of claim 18, wherein resetting the accelerator position when the accelerator is fully displaced results in no additional requestable torque via the accelerator.

22. The method of claim 20, further comprising updating the learned idle position of the accelerator to the current accelerator position as the accelerator releases back towards a normal idle position.

\* \* \* \* \*